United States Patent Office 2,749,788
Patented June 12, 1956

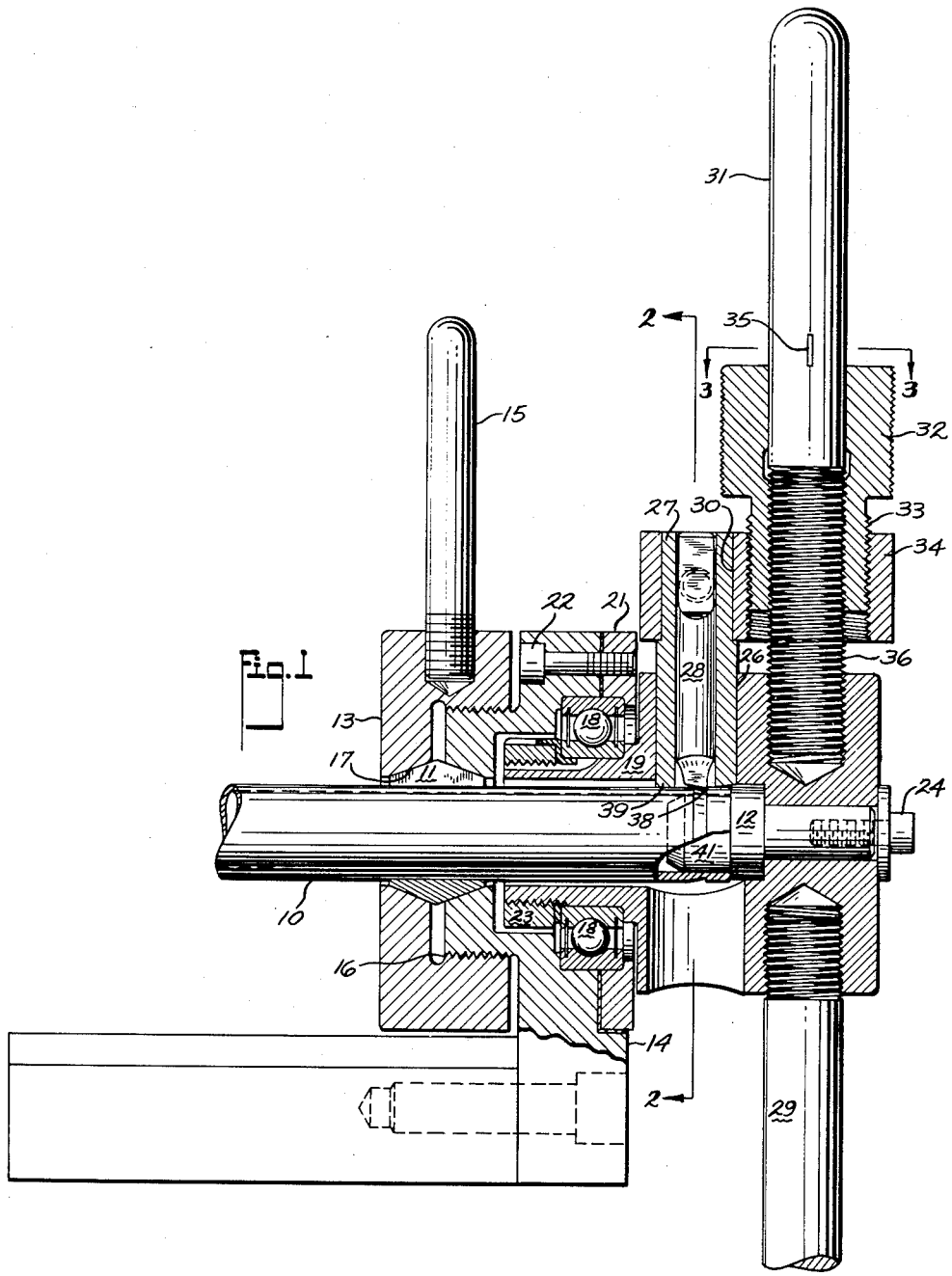

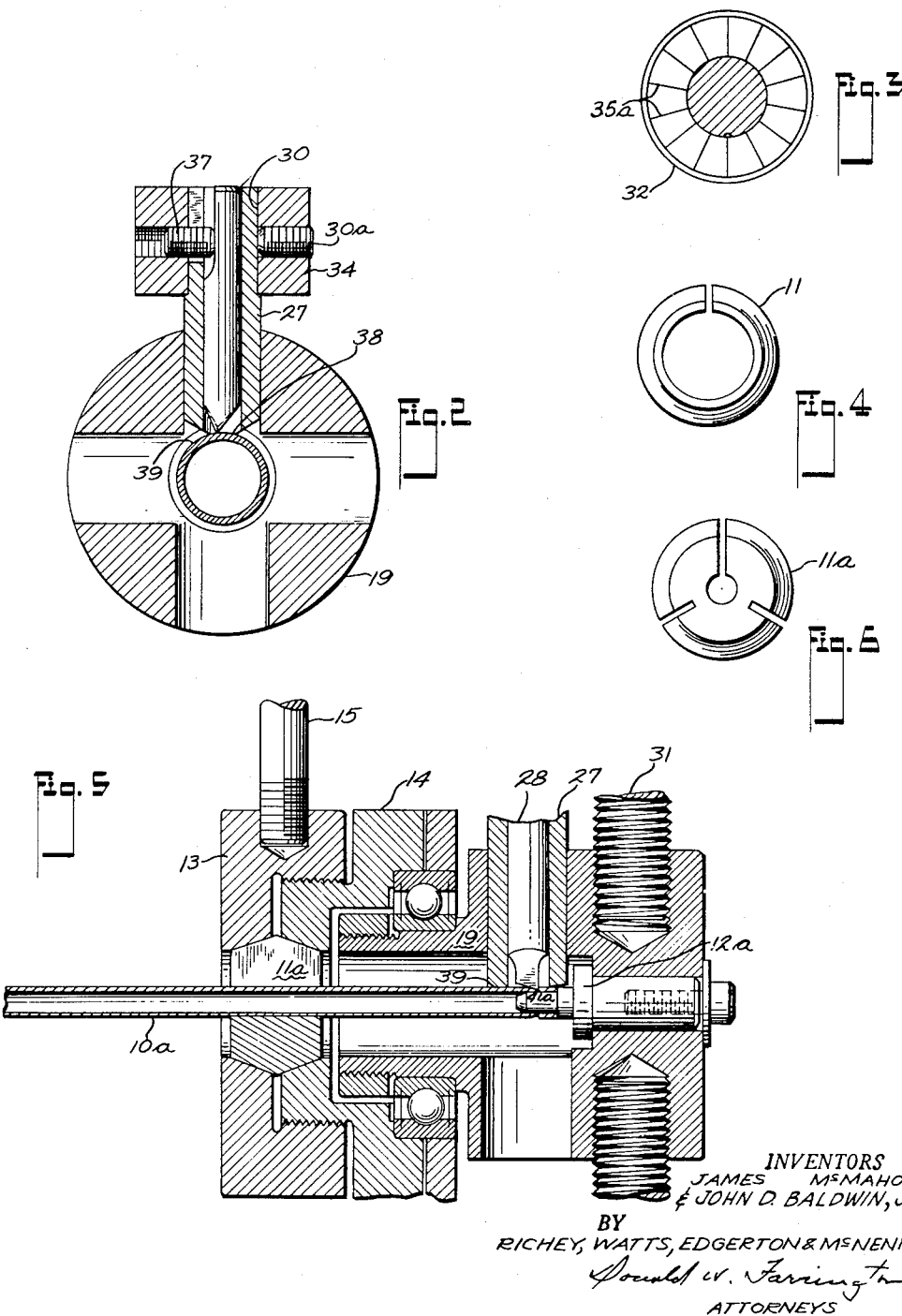

2,749,788
PRE-GROOVING TOOL

James McMahon, Cleveland Heights, and John D. Baldwin, Jr., Highland Heights, Ohio, assignors to The Weatherhead Company, Cleveland, Ohio, a corporation of Ohio Application September 10, 1952, Serial No. 308,824

1 Claim. (Cl. 82—1)

This invention relates to an apparatus for grooving tubing in general and more particularly to an apparatus to pre-groove tubing for use with fittings wherein a metal sleeve is compressed into engagement with the tube.

When using fittings similar to those disclosed by the Patents 2,414,184 and 2,460,635 it is normal to provide a sleeve which is substantially harder than the tube so that the sleeve will cut into the surface of the tube thereby forming sealing engagement between the two members. In many applications, however, it is necessary to use a coupling which is fabricated from the same material as used in the tube and when this is done without pregrooving the tubing, the results are very unsatisfactory since the sleeve does not cut into the surface of the tube. One outstanding example of where this situation exists is in the food processing industry wherein the tubing and all fittings must be made of stainless steel or similar non-corrosive material. In this particular application it is of utmost importance that no corrosion be present which would contaminate or spoil the food being processed; therefore, handling apparatus fabricated completely from stainless steel is necessary.

The object of this invention is to provide a pregrooving device which will accurately and easily form a groove in metal tubes.

Another object of this invention is to provide a device which is adaptable to a large variety of tube sizes and which automatically locates the groove on the tube.

Still another object of this invention is to pregroove a tube to provide a seat for the above described sleeves when the sleeves and the tubes are formed of metals having substantially equal hardness.

The foregoing and other objects and advantages will become apparent in view of the following description taken in conjunction with the drawings, wherein:

Fig. 1 is a view partially in section showing the assembled pre-grooving tool with a tube in position;

Fig. 2 is a sectional view taken along the plane 2—2 of Fig. 1 showing the mounting means of the tool;

Fig. 3 is a view partially in section taken along the plane 3—3 of Fig. 1 disclosing the radial markings on the adjustment nut;

Fig. 4 is an end view of the ring chuck shown in Fig. 1;

Fig. 5 is a sectional view of a modification of the grooving tool for grooving a tube having a small diameter; and Fig. 6 is an end view of the ring chuck shown in Fig. 5.

Referring to the drawings: Fig. 1 discloses a preferred embodiment of this invention wherein the pregrooving tool is adapted for mounting in a vise. It is understood that any suitable mounting means may be used to secure the pre-grooving tool but the one shown has advantages of portability. The tube 10 which is to be grooved is inserted through the ring chuck 11 until the end surface engages the locating stop 12. The locating stop 12 is proportioned so that the resulting groove will be accurately spaced from the end of the tube. The ring chuck 11 is formed so that it may be contracted into clamping engagement with the tube thus securing the tube against any axial or rotational movement. The clamping means for this purpose is composed of a locking ring 13 which may be rotated relative to the tool body 14 by the handle 15. The members 13 and 14 are threaded together as at 16 so that relative rotational movement will have the effect of moving the locking ring axially relative to the tool body 14. The ring chuck 11 is formed with inclined surfaces 17 which engage corresponding surfaces on the locking ring and the tool body. The parts are arranged so that axial motion of the locking ring toward the tool body causes the ring chuck 11 to be compressed thereby clamping the ring chuck 11 against the tube and securing the tube against all movement.

To mount the rotating cutting tool assembly so it may rotate relative to the tool body 14 the bearings 18 are located between the tool body and the rotating member 19 securing the rotating member in axial alignment with, and axially spaced from, the tool body 14. The tool body bearing ring 21 in conjunction with the bolts 22 provides means for clamping the outer non-rotating race of the bearing to the tool body. The rotating member ring 23 threads onto the rotating member 19 providing means for clamping the inner rotating race of the bearings 18.

To provide for accurate axial positioning of the tube the locating stop 12 is mounted on the axis of the rotating member 19 and is secured therein by the bolt 24 which accurately positions the locating stop axially and radially. The radial bore 26 is provided as a guide means for the cutting tool sleeve 27 in which the cutting tool 28 is mounted. The cutting tool sleeve is slidable in the bore 26.

The handles 29 and 31 are mounted in the rotating member by any suitable means. In the preferred embodiment these handles are threaded into counter-bores thereby securing them in the rotating member 19 and both handles operate to permit the operator of the pregrooving tool to rotate the rotating member easily when operating the device. The threads on the handle 31 are utilized for moving the cutting tool sleeve 27 and thereby cutting the tool 28 radially so that the groove may be cut in the tube. An indexing knob 32 is threaded to the handle 31 so that rotation of the knob causes axial movement along the handle 31. External threads 33 are provided on the indexing knob 32 which engage corresponding threads in the radially adjustable block 34 which is attached to the cutting tool sleeve 27 by any suitable means. In the preferred embodiment a bore 30 is formed in the block which fits over the sleeve 27 and a set screw 30a is provided to lock the elements together. As the indexing knob is rotated relative to the radial adjustment block 34 the thread means 33 causes axial motion between the two elements. If the lead of the thread 33 between the index knob and the adjustment block 34 is equal to the lead of the thread 36 between the indexing knob and the handle 31, the axial motions of the two threads will be cancelled and there will be no relative motion between the adjustment block 34 and the handle 31. In the preferred embodiment of this invention, the thread 36 is provided with a larger lead than the thread 33 so that the adjustment block 34 will move axially relative to the handle 31 according to the differential between the leads of the threads. By utilizing definite combinations of the threads 36 and 33 it is possible to achieve numerous useful ratios of the axial movement of the cutting tool sleeve relative to the rotational movement of the indexing knob. If fast action is required it is possible to use a combination of left and right handed threads resulting in additive motions.

The handle 31 may be formed with an axial reference mark 35 which in combination with the radial calibration marks 35a on the upper surface of the indexing knob 32 provide calibration of the radial movement of the radial adjustment block 34. If the thread 36 is formed with 18 threads per inch and the thread 33 is formed with 24 threads per inch one revolution of the indexing knob will cause the radial adjustment block 34 to move substantially fourteen thousandths of an inch, therefore if fourteen equally spaced marks 35a are provided on the indexing knob 32 each mark will indicate a radial movement of about one thousandth of an inch.

The cutting tool 28 is secured against axial motion relative to the cutting tool sleeve 27 by a set screw 37. In the preferred embodiment of this invention the cutting edge 38 is adjusted so that it protrudes beyond the end face 39 of the cutting tool sleeve a distance equal to the desired depth of the groove to be cut. By employing this means the end surface 39 acts as a stop to prevent the cutting of a groove of too great a depth and eliminates any possibility of cutting off the end of the tube. The locating stop 12 has an extension 41 which fits into the bore of the tube 10 and prevents any collapsing of the tube as the cutting operation takes place.

In Fig. 5 a modified form of the pre-grooving tool is shown adapted for use with a smaller diameter tube 10a, a ring chuck 11a having a bore suitable for the tube 10a is mounted in the pre-grooving tool in the same way as the ring chuck 11 previously described, a locating stop 12a having an extension 41a adapted for use with the tube 10a is mounted in the same manner as the locating stop 12 shown in Fig. 1. The cutting tool 28 is adjusted so that it protrudes beyond the end surface 39 of the cutting tool sleeve 27 an amount equal to the depth of the desired groove. It can be seen that this pre-grooving tool may be adapted for a variety of sizes of tubes merely by inserting ring chucks and locating stops adapted for the particular tube to be grooved.

In operation the tube 10 is inserted through the ring chuck 11 until it butts against the locating stop 12 and is then clamped in place by turning the handle 15. Before this is done the indexing knob is rotated to lift the cutting tool so that the tube may pass beneath the cutting edge 38. The indexing knob is then rotated until the cutting edge 38 engages the surface of the tube 10. The index knob is then indexed one mark causing the cutting edge 38 to cut into the surface of the tube 10. The handles 29 and 31 are then revolved causing the cutting tool to rotate around the tube 10 cutting out a portion of the tube. The indexing knob is then rotated to the next mark again moving the cutting edge toward the tube and handles are then revolved taking another cut from the surface of the tube. This is repeated until the end surface 39 of the cutting tool sleeve engages the surfaces of the tube 10 thus preventing any further cutting of the tube. The indexing knob is then rotated in the reverse direction lifting the cutting tool from the tube and permitting the removal of the pre-grooved tube.

Having completed a detailed description of a preferred embodiment of the present invention so that others skilled in the art may be able to understand and practice the same, we state that what we desire to secure by Letters Patent is not limited by said preferred embodiment but rather is defined in what is claimed.

What is claimed is:

An apparatus for cutting grooves in the outer surface of tubes near the end thereof comprising a clamping means for securing said tube against movement, a rotating means arranged for rotation about the axis of said tube in a fixed space relationship with said clamping means, a locating stop mounted on said rotating means providing a locating surface for engaging the end of said tube, a cutting tool mounting means adapted for radial motion relative to said rotating means, an indexing knob formed with a bore threaded to said rotating means and an external surface threaded to said mounting means, said threads arranged to provide fine adjustment of said radial motion as said knob is rotated, a cutting tool secured in said mounting means for motion with said mounting means, said mounting means provided with a tube engaging surface to limit the motion of said tool toward said tube, said locating stop formed with an extension extending into the bore of said tube preventing the tube from collapsing as said cutting tool cuts said groove.

References Cited in the file of this patent
UNITED STATES PATENTS

| | | |
|---|---|---|
| 291,971 | Atwood | Jan. 15, 1884 |
| 402,730 | Foerster | May 7, 1889 |
| 412,065 | Beardsley | Oct. 1, 1889 |
| 612,743 | Maier | Oct. 18, 1898 |
| 859,642 | Cummings | July 9, 1907 |
| 1,237,677 | Murphy | Aug. 21, 1917 |
| 1,674,372 | Nonneman | June 19, 1928 |
| 1,707,478 | Hyde | Apr. 2, 1929 |
| 2,000,300 | Scruby | May 7, 1935 |
| 2,043,353 | Koonz | June 9, 1936 |
| 2,109,857 | Berkman | Mar. 1, 1938 |
| 2,181,450 | Davenport | Nov. 28, 1939 |
| 2,288,670 | Babiary | July 7, 1942 |
| 2,388,790 | Mackliet | Nov. 13, 1945 |
| 2,478,310 | Payne | Aug. 9, 1949 |
| 2,486,830 | Farrar | Nov. 1, 1949 |
| 2,582,279 | Reimschissel | Jan. 15, 1952 |
| 2,619,863 | Bechler | Dec. 2, 1952 |